Patented Apr. 6, 1943

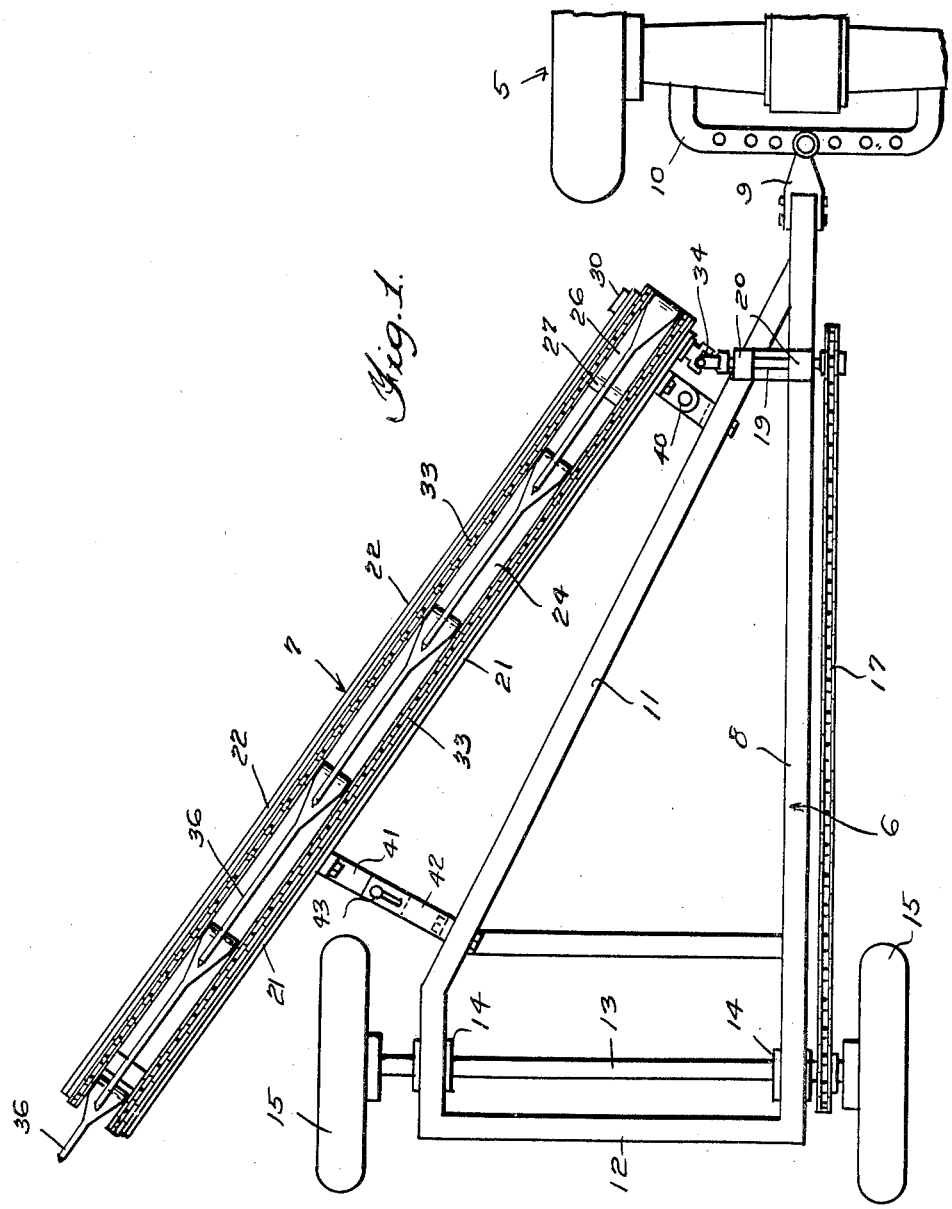

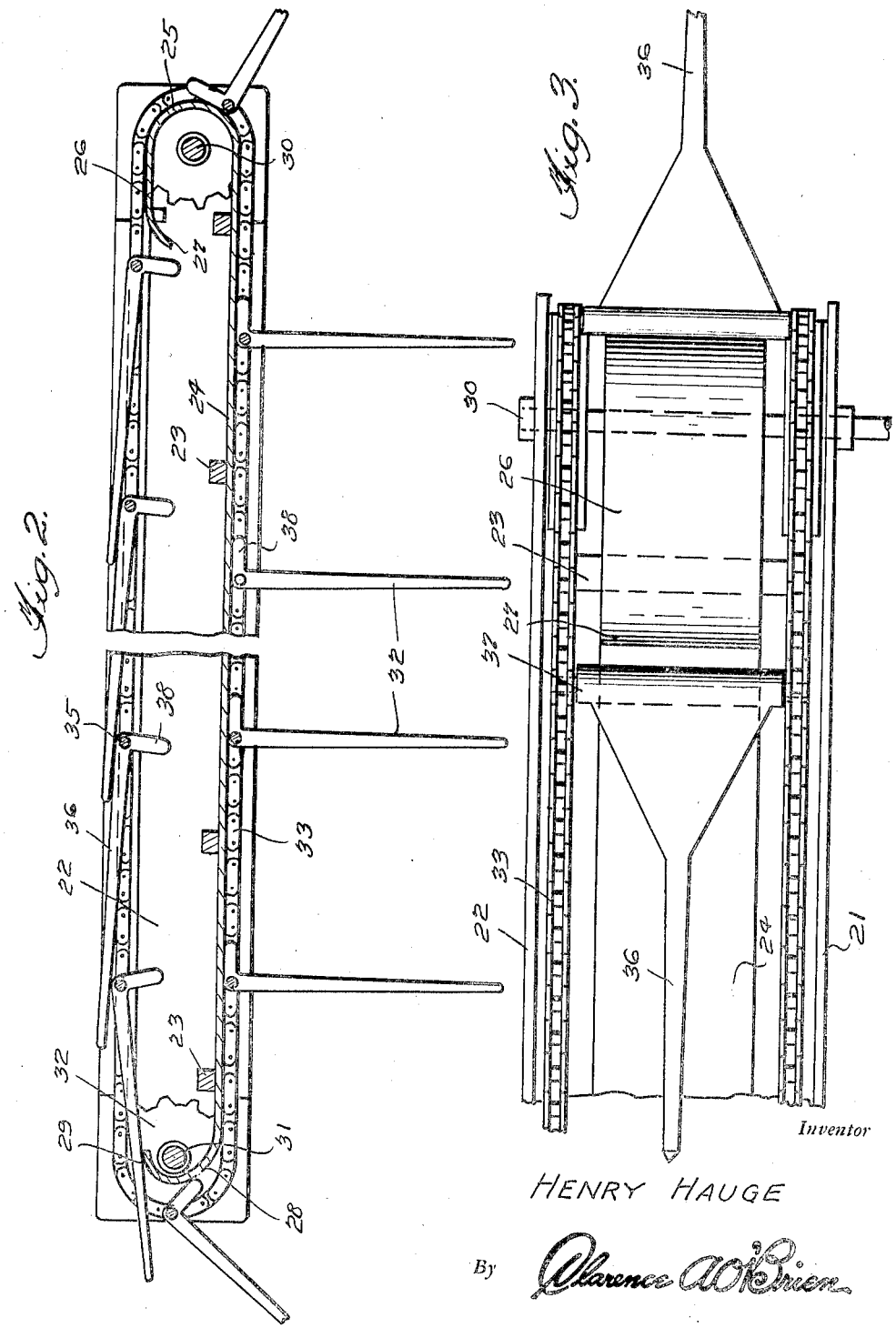

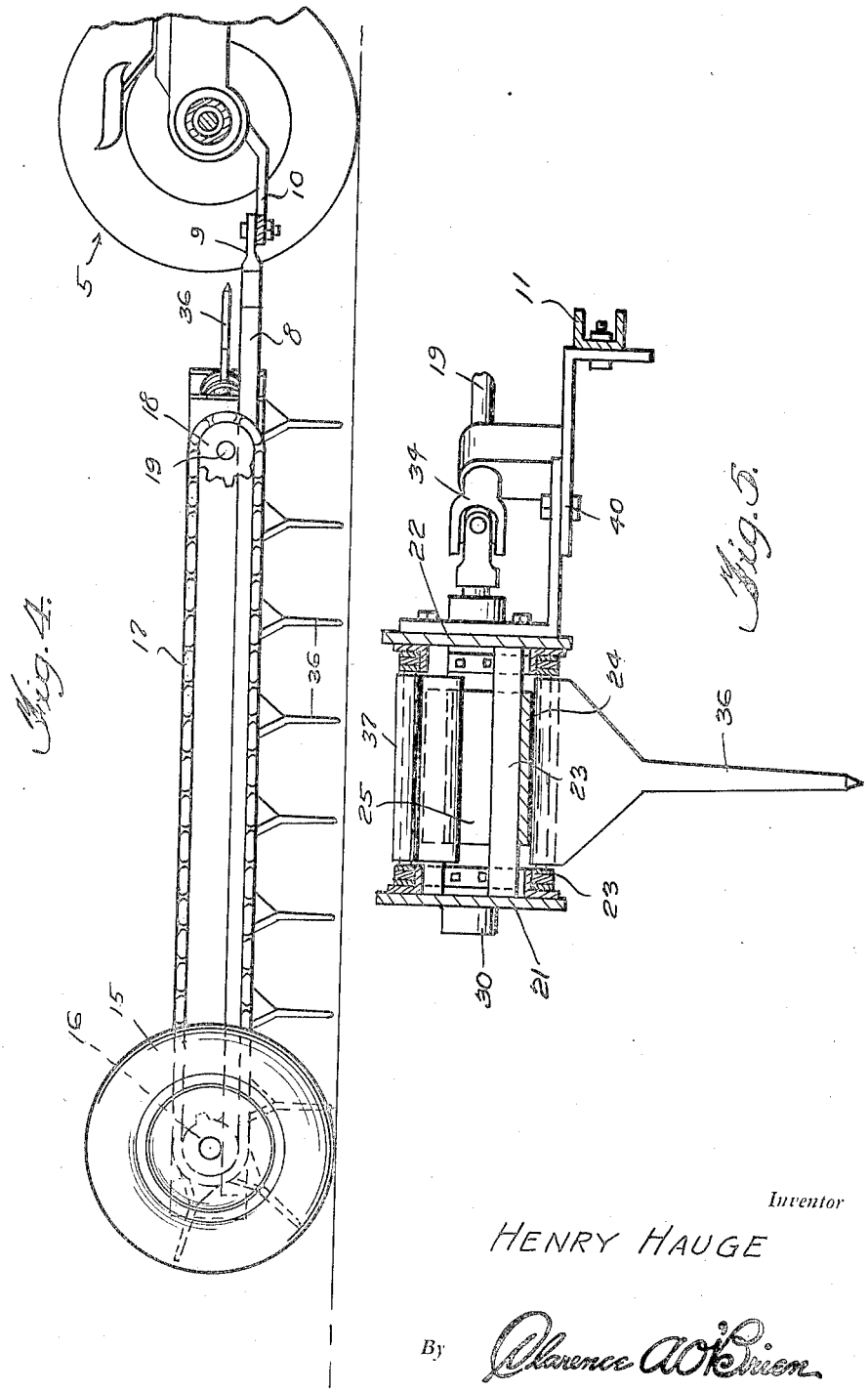

2,315,522

UNITED STATES PATENT OFFICE 2,315,522

WINDROW TURNING MACHINE

Henry Hauge, Buxton, N. Dak.

Application October 9, 1941, Serial No. 414,342

2 Claims. (Cl. 56—370)

This invention relates to new and useful improvements in agricultural machinery and more particularly to a machine for turning windrows to hasten the drying thereof.

The principal object of the present invention is to provide a mechanical device which can be readily attached to a tractor for the purpose of rapidly turning over windrows to expose to the wind and sun damp or wet parts of grain or hay to the end that more rapid drying is effected.

Other objects and advantages of the invention will become apparent to the reader of the following specification.

In the drawings:

Figure 1 represents a top plan view of the machine shown connected to the tail piece of a tractor.

Figure 2 is a longitudinal sectional view through the wing unit of the machine.

Figure 3 is a fragmentary enlarged top plan view.

Figure 4 is a side elevational view showing a portion of a tractor in section.

Figure 5 is a cross sectional view through the turner wing factor of the machine.

Referring to the drawings wherein like numerals designate like parts, it can be seen in Figure 1, that numeral 5 generally refers to a conventional tractor. The machine consists in construction of a wheeled frame 6 and a turner wing 7. The frame 6 comprises a side member 8 connected by a coupling 9 to the tail part 10 of a tractor. Extending rearwardly and obliquely with respect to the side bar 8 is a bar 11 and these bars 8 and 11 are connected by a rear transverse bar 12. An axle 13 extends through bearings 14 at the rear ends of the bars 8, 11 and has wheels 15 thereon. One end of this shaft 13 has a sprocket wheel 16 from which a sprocket chain 17 extends to train over a sprocket wheel 18 on a short shaft 19 journaled through a bearing structure 20 on the forward end portions of the bars 8, 11. Thus driving means is afforded for the turner 7.

The turner wing consists in construction of a pair of elongated side walls 21, 22 connected by a cross member 23 and to this cross member is secured an elongated track 24, this track 24 at its forward end being curved upwardly and backwardly as at 25 and 26, respectively, the same having at the end of its backwardly disposed portion 26 a downwardly curved terminus 27.

The other end of the track 24 is curved upwardly as at 28 and backwardly as at 29.

Shafts 30 and 31 extend through the forward and rearward ends of the side walls 22, 21 and each has a pair of sprocket wheels 32 thereon over which a pair of elongated endless sprocket chains 33 are trained.

A universal connection 34 is provided between the shaft 30 and the shaft 19 (see Figure 1).

At equal spaced intervals the chains 33 are bridged by pins 35 on which elongated tapered tines 36 are swingably supported, each tine being provided with a barrel 37 rotatable on the corresponding pin 35. Projecting from each of the barrels 37 is a foot 38 and the purpose of this foot 38 is to ride the track 24 as suggested in Figure 2 when a corresponding tine is in depending position so as to afford a rigid tine for pushing over hay or grain in a windrow as the chains move.

At this point, it can be seen that the depending tines (see Figure 2) move toward the left and as the feet 38 ride the curved portion 28 the tines have a tendency to swing out until the feet 38 drop over the upper end 29 of the track from where they are pulled with each tine riding over the upper end 29 until the next tine comes under the free end of the advanced tine. This permits the tines to move in a substantially horizontal position when passing along the top of the turner unit, but when the feet 38 strike the curved portion 27 at the forward end of the track 24 the tines are moved to an upright position and outstanding with respect to the track 24 until they again reach the curved portion 28.

A pivotal connection 40 is provided between the forward end of the side wall 21 and the side member 11 of the frame 6 and a pair of brackets 41, 42 between the rear portion of the frame member 11 and a rear portion of the side wall 21 have an adjustable connection 43 which permits desired adjustment between the frame member 11 and the wing 7.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a windrow turning implement, a wheel supported frame, a turner unit mounted on one side of the frame and including a pair of parallel side bars inclining rearwardly and outwardly therefrom, a pair of endless traveling sprocket chains mounted between said bars side by side and extending from end to end thereof with upper and lower stretches parallel with the same, a plurality of tines pivoted to said chains and spaced along the same for vertical swinging movement therebetween into horizontal and pendent positions, respectively, and means operative under travel of said chains to cause said tines to swing into pendent position from the lower stretches of said chains, said means blocking swinging of the tines from pendent position reversely relative to the direction of travel of said lower stretches, and wheel operated means for driving said chains.

2. In a windrow turning implement, a wheel supported frame, a turner unit mounted on one side of the frame and including a pair of parallel side bars inclining rearwardly and outwardly therefrom, a pair of endless traveling sprocket chains mounted between said bars side by side and extending from end to end thereof with upper and lower stretches parallel with the same, a plurality of tines pivoted to said chains and spaced along the same for vertical swinging movement therebetween into horizontal and pendent positions, respectively, and means operative under travel of said chains to cause said tines to swing into pendent position from the lower stretches of said chains, said means blocking swinging of the tines from pendent position reversely relative to the direction of travel of said lower stretches, and wheel operated means for driving said chains, said first-mentioned means comprising a track member between said bars and angular ends on said tines wipingly engaging said track member.

HENRY HAUGE.